(12) United States Patent
Smith et al.

(10) Patent No.: US 12,217,065 B1
(45) Date of Patent: Feb. 4, 2025

(54) APPARATUS AND METHOD FOR DETERMINING SYSTEM MODEL COMPARISONS

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/414,790

(22) Filed: Jan. 17, 2024

(51) Int. Cl.
G06F 9/44 (2018.01)
G06F 9/448 (2018.01)

(52) U.S. Cl.
CPC ................... *G06F 9/4494* (2018.02)

(58) Field of Classification Search
None
See application file for complete search history.

(56) References Cited

U.S. PATENT DOCUMENTS

| | | | | |
|---|---|---|---|---|
| 10,719,301 | B1* | 7/2020 | Dasgupta | G06F 8/34 |
| 11,836,589 | B1* | 12/2023 | Ormont | G06N 7/01 |
| 11,972,333 | B1* | 4/2024 | Horesh | G06N 3/088 |
| 2006/0020500 | A1 | 1/2006 | Turner | |
| 2020/0184343 | A1 | 6/2020 | Samarev | |
| 2020/0302287 | A1* | 9/2020 | Tachibana | G06N 3/04 |
| 2021/0304069 | A1* | 9/2021 | Tang | G06N 20/00 |
| 2022/0335313 | A1 | 10/2022 | Sengupta | |
| 2023/0068203 | A1 | 3/2023 | Yin | |
| 2023/0094742 | A1* | 3/2023 | Geist | G06N 20/20 706/12 |
| 2023/0325469 | A1* | 10/2023 | Schiff | G06V 10/774 |
| 2023/0419103 | A1* | 12/2023 | Dhurandhar | G06N 3/045 |
| 2024/0028831 | A1* | 1/2024 | Jain | G06F 16/38 |

\* cited by examiner

*Primary Examiner* — Insun Kang
(74) *Attorney, Agent, or Firm* — Caldwell Intellectual Property Law

(57) ABSTRACT

An apparatus for determining system model comparison is disclosed. The apparatus includes a processor and a memory communicatively linked to the processor. The memory instructs the processor to receive a first plurality of system data, wherein the first plurality of system data represents a first state of a system, and a second plurality of system data representing a second of the system. The memory instructs the processor to generate a first and second model of the system using the system data. The memory instructs the processor to output a first model output using the first model of the system and the second plurality of system data. The memory instructs the processor to modify the second plurality of system data using perturbation function. The memory instructs the processor to output a second model output using the second model of the system and the modified second plurality of system data. The memory instructs a processor to compare the first model output to the second model output using an optimization function. The memory instructs a processor to generate a state change output corresponding to the system using the comparison.

17 Claims, 7 Drawing Sheets

APPARATUS AND METHOD FOR DETERMINING SYSTEM MODEL COMPARISONS

FIELD OF THE INVENTION

The present invention generally relates to the field of invention relates to utilizing characteristics of an entity to increase value of business operations. In particular, the present invention is directed to an apparatus and method for determining system model comparisons.

BACKGROUND

In general, processes for system model comparison represent a challenge for automated optimization algorithms. In particular, reconciling differences in underlying assumptions and complexities, which can impact the accuracy and fairness of the comparison results.

SUMMARY OF THE DISCLOSURE

In an aspect, an apparatus for determining system model comparison includes at least a processor and a memory communicatively linked to the at least one processor, wherein the computing device containing instructions configure the at least a processor to receive a first plurality of system data, wherein the first plurality of system data represents a first state of a system, and a second plurality of system data representing a second of the system, generate a first model of the system, using the system data, generate a second model of the system, using the system data, output a first model output using the first model of the system and the second plurality of system data, modify the second plurality of system data using at least a perturbation function, output a second model output using the second model of the system and the modified second plurality of system data, compare the first model output to the second model output using an optimization function, and generate a state change output corresponding to the system using the comparison.

In another aspect, a method for determining system model is disclosed. The method includes receiving, by the at least a processor, a plurality of system data. The method includes determining, by the at least a processor, the first model of the system according to the system data and the second model of the system according to the system data. The method includes generating, by the at least a processor, a first model of the system and the second plurality of system data. The method includes configuring, by the at least a processor, a second model using the second model of the system and the modified second plurality of system data. The method includes modifying, by the at least a processor, the second plurality of system data using at least a perturbation function. The method includes determining, by at least a processor, a state of change corresponding to the system using the comparison in optimization function.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for determining system model comparison for an entity. In an embodiment, apparatus includes a memory communicatively linked to the one processor, wherein the processor includes a computing device to receive a first plurality of system data, wherein the first plurality of system data represents a first state of a system, and a second plurality of system data representing a second of the system, and generate a state change output corresponding to the system using the comparison.

Figure 1:
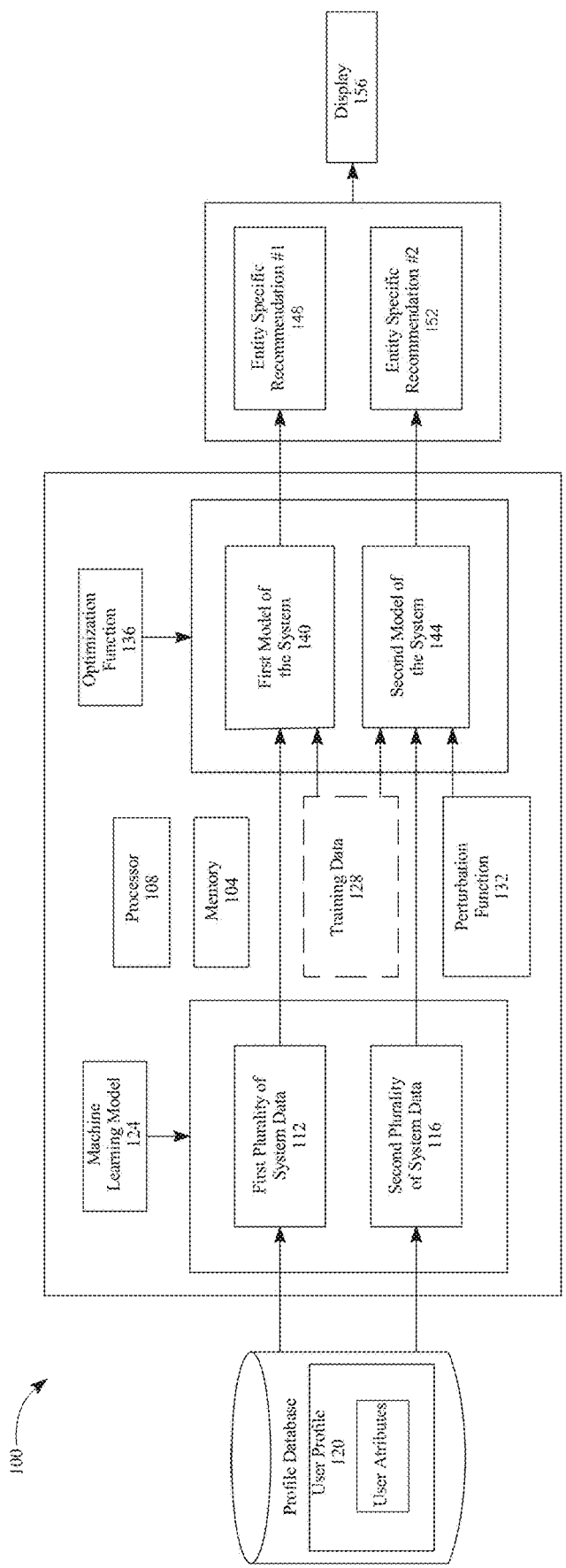
FIG. 1 is a block diagram of an exemplary embodiment of an apparatus for routine improvement for an entity.

Referring now to FIG. 1, an exemplary embodiment of an apparatus 100 for determining system model comparison is illustrated. Apparatus 100 may include a memory 104. Apparatus 100 may include a processor 108. Processor 108 is communicatively connected to a computing device. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. Processor 108 may include, without limitation, any processor described in this disclosure. Apparatus 100 may be included in a computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing devices may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing devices may be implemented, as a non-limiting example, using a "shared nothing" architecture.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, memory 104 contains instructions configuring processor 108 may receive a first plurality of system data 112. "System data," as used in this disclosure, is data received from, generated, processed, or utilized within a system. It encompasses various types of data that are specific to and associated with the functioning, operations, or processes of a system. System data may include, without limitation, operational metrics, performance measurements, configuration settings, error logs, event records, user interactions, input/output data, and other relevant data points. System data may provide insights into behavior, performance, and state of the system, enabling administrators, engineers, or users to evaluate and manage it effectively. System data may be used for monitoring, analysis, troubleshooting, optimization, and decision-making within the system. Measures safeguarding the confidentiality, integrity, and availability of system data may be taken, for instance to ensure compliance with relevant privacy and data protection regulations. System data may include, without limitation, an entity profile. As used in this disclosure, "entity profile" is a grouping of data relating to an entity's abilities which contains basic entity information as well as data relating to an entity's performance and abilities. As a non-limiting embodiment, entity profile may include performance data such as, and without limitation, entity's attributes (e.g., personality traits, assets, connections, resources, credentials, and the like). Entity profile may include an entity's skill, education level (e.g., bachelor's degree), deportment trait, personality trait, current role (e.g., job position), compensation, mindset, and the like. In other embodiment, performance data of entity profile may include cognitive identifiers such as, and without limitation, entity's mental traits (e.g., instinctive operations, risk aversion, assertiveness, aptitude), emotional state (e.g., mindset, such as happiness or aggression), and the like. Entity profile may further include an entity's competent activities and incompetent activities.

With continued reference to FIG. 1, entity profile may include basic information, such as, without limitation, current characteristics, future expected characteristics, and/or client goal. In some embodiments, entity profile may be received as input data. Processor 108 configures first model of the system 140 based on the input data. As used in this disclosure, a "first model" of a system is a data structure designed to store and/or represent attributes of the system. First model of a system may represent an initial understanding or profile of the system, entity based on the available information. In an embodiment, first model may include a machine-learning model 124. In an embodiment, apparatus 100 may utilize machine-learning algorithms to refine the first model of the system 140 over time; apparatus 100 may use first plurality of system data 112 as training data. For instance, where plurality of system data includes data describing system inputs and correlated system outputs, apparatus 100 may use such input and output data to train a first model to generate outputs that match system outputs, for a given input, as determined by an error function comparing system output data to corresponding data produced by first model. In some cases, where first plurality of system data includes additional input data, such data may be used as additional training data. To train the first model, input data related to an individual, such as an employee of an entity, including their personality traits, assets, connections, resources, credentials, and other relevant information, is received. The first model system, comprising a plurality of components, processes this input data and generates performance data as its output. The training of the first model involves utilizing a combination of techniques, algorithms, and methodologies suitable for the specific domain and objectives. The received input data is used as the basis for training the first model system, allowing it to learn patterns, relationships, and dependencies within the data.

With continued reference to FIG. 1, apparatus 100 may generate second model by training it using the first system data. First system of data, which serves as the foundation for second model, may undergo a perturbation function before being used for training. Perturbation function 132 may be implemented, without limitation, as described below.

With continued reference to FIG. 1, processor 108 is configured to output a first model output using first model and second plurality of the system data 116. In an embodiment, outputting first model output may include identifying at least a datum of second plurality of system data 116 representing a system input and inputting the at least datum into first model; identification of data representing system input may be performed, without limitation, by detecting a label that indicates data represents a system input. Datum may represent a specific value, measurement, or observation that is captured, stored, or processed by the system. As a non-limiting example, datum may include a single data point or a single piece of information within a system, like a building block that contributes to the overall collection and understanding of data within the system.

Further referring to FIG. 1, apparatus 100 may be configured to modify the second plurality of system data 116 using at least a perturbation function. As used in this disclosure, a "perturbation function" is a software or hardware function and/or subroutine employed to introduce variations or disturbances to a set of data. One such variation includes the introduction of random or pseudorandom elements into the data. This could be in the form of adding, multiplying, or replacing given elements with numbers generated from established random or pseudorandom number generators. This form of random perturbation may add a degree of uncertainty that allows for more robust testing and evaluation of the system's resilience and adaptability to unexpected inputs or fluctuations. Moreover, perturbation function may be designed to modify first model in a controlled manner by adding or altering certain elements or parameters. In one instance, apparatus 100 may incorporate perturbation function 132 designed to evaluate the sensitivity and stability of systems or algorithms. Perturbation function 132 may operate by receiving existing data or variables and systematically introducing controlled changes or perturbations to them. These perturbations, both random and intentional, may be tailored to meet specific requirements and/or goals of an evaluation, allowing for additive, subtractive, multiplicative, or other forms of alterations within predefined bounds. In addition, perturbation function 132 may be used to simulate real-world changes in the data. This may be achieved by utilizing a machine learning model 124 that is trained to output potential changes in input, output, and/or internal system data. This training may require examples that correlate previous states or systems with changes in those states, emulating systems that previously underwent similar changes; such changes and correlated states may be input and/or labeled by users, as a non-limiting example. In another embodiment, perturbation function 132 is employed to modify data representing internal parameters of the system, enabling the evaluation of system sensitivity and stability. Perturbation function 132 may operate by systematically introducing controlled changes or disturbances within predefined bounds to the existing data. By perturbing the data representing the internal parameters, this process may facilitate the analysis of system's response to these perturbations, whether they are random or mimic real-world scenarios. This approach aids in both understanding the system's resilience and anticipating its behavior under varying conditions. As used in this disclosure, "internal parameters" refers to the variables and/or factors that are intrinsic to a system and/or model that are within the system itself and are not influenced by external factors. As a non-limiting example, in machine-learning model, internal parameters are the weights and biases assigned to the model's connections or nodes. These internal parameters are learned through the training process and determine how model processes and interprets input data. For example, in an investment strategy optimization scenario, different machine learning models might be employed to forecast stock or asset prices based on historical data and market indicators. Each model would have its own internal parameters shaped through training, leading to different predictions and investment recommendations. Using the perturbation function, variations in these internal parameters may be introduced to see how they affect the model's forecasting performance and the resulting investment outcomes. For example, first perturbations with first model system may relate to risk-averse, favoring stable assets, the other may make it more risk-tolerant, favoring volatile assets with higher potential returns.

Still referring to FIG. 1, second plurality of system data 116 may be modified by processor 108 using perturbation function. Perturbation function, as previously discussed, may introduce controlled changes or disturbances to the data representing input, output, and/or internal parameters of the system. In an embodiment, apparatus 100 may be further configured to modify second model using data representing internal parameters of system. Perturbation function may be utilized to modify the second plurality of system data 116 to evaluate the impact or sensitivity of the system to these modifications. For example, the modification could involve replacing a parameter with a perturbed version of it. This is an example of an additive perturbation, where the original value of the parameter is changed by adding a small, calculated disturbance to it. Example of an additive perturbation, where the original value of the parameter is changed by adding a small, calculated disturbance to it. Apparatus 100 may include but is not limited to, for example, perturbation function 132 could use a multiplicative alteration, wherein the original parameter value is scaled by a certain factor, either enhancing or diminishing its effect within the model. Alternatively, the parameter could be completely replaced by a new, generated value to test the system's response to dramatic changes. As a non-limiting example, perturbation function 132 could also be used to insert noise or random elements into the parameters. This technique is particularly useful in evaluating the robustness of the system for unexpected or stochastic changes in the parameter values. In some cases, it may also involve the swapping or rearranging of parameter values or subsets of values within the model. This method allows for an examination of the system's dependency on the relative positioning and correlation of parameters. These diverse perturbation methodologies offer a comprehensive means to assess system stability and resilience under a wide range of modifications.

With continued reference to FIG. 1, processor 108 uses modified second plurality of system data 116 in conjunction with the second model, which is machine-learning model, to produce second model output. This process involves feeding the perturbed internal parameters of the system data into machine-learning model. As a non-limiting example, system data contains information of client's previous interactions with the company's products or service, for example, usage patterns, feedback, along with internal company data about product usage trends, support ticket trends, and more. Second plurality of system data may introduce a perturbation where the company may launch a new software update. This update may bring with it changes in user interface, new features, and improvements in speed or security. Perturbed data may then be inputted into second machine-learning model, allowing to predict the likely outcomes of this scenario, for example, changes in customer satisfaction, usage patterns, or any other metrics relevant to the entity. Making informed decisions about the possible impacts of implementing such a change helps entity aids in valuation optimization.

Still referring to FIG. 1, processor 108 compares first output to second output using an optimization function. An "optimization function," as used in this disclosure, serve as a measure to determine the efficacy or quality of the outputs derived from first and second models. It is used to quantify the difference between the model outputs, and therefore provides a benchmark to determine which model's output aligns more closely with a desired objective or optimal solution. An important criterion for this optimization function may be the value generated by each model. For example, value may be quantified in terms of net income, increased asset prices, or other relevant financial matrices, depending on the specific context and goals. Optimization function may evaluate the models based on their ability to maximize defined value, identifying model output, results in the most valuable beneficial outcome. This process may assist in the decision-making process, highlighting the model and corresponding parameter set that may offer the highest value. In an embodiment, first model output compares with second model output may include first model output compares with second model output using a fuzzy inferencing system. As described herein, "fuzzy inferencing system" built on principles of fuzzy logic, provides a mechanism to make decisions under conditions of uncertainty or imprecision. The system processes the outputs of both models and uses fuzzy rules, to evaluate these outputs. For example, the inputs could be fuzzified using relevant factors, and fuzzy outputs related to the quality or desirability of the plan could be determined. A rule might state: if production capacity is high and cost is low and efficiency is high, then plan quality is very high. Similar rules could be established for both models, creating a framework that assesses the relative quality of the outputs. Through this fuzzy inferencing system, an evaluation can be made as to which model produces the most ideal plan. As a result, a state change output may be generated, corresponding to the system using this comparative analysis. In another embodiment, first model output compares with second model output may involve the use of machine-learning model 124 to compare outputs of first and second models. This model could be trained to assign scores or ratings to the outputs based on certain predetermined criteria or metrics. The assigned scores can provide a quantifiable measure of the quality or performance of each model's output. For example, machine-learning model 124 serves as an additional layer of evaluation, offering insights into the comparative efficacy of the models and aiding in the identification of potential areas for model refinement and improvement. This approach may further enhance the system's capacity to adapt and optimize in response to perturbations or changes in the internal parameters.

With continued reference to FIG. 1, processor 108 compares the output of first model to second model using a specifically trained machine-learning model. This comparison may aim to assess the performance, accuracy, or reliability of the models and determine their suitability for specific tasks or applications. To achieve this, the machine-learning model 124 is trained using a dataset that comprises outputs from the first and second models, along with corresponding values or evaluations. These data points serve as examples of ideal outputs and allow the model to learn correlations between specific features of the model outputs and associated performance metrics. The training process may involve using a loss function, which quantifies the difference between the model's predictions and the actual values. During training, model's parameters are adjusted to minimize this loss function, thus improving model's predictive accuracy over time. Once trained, machine-learning model 124 can then be used to compare new outputs from the first and second models. Receiving these outputs as input, processing them based on its learned patterns, and producing a score or rating for each one. These scores reflect the perceived quality or reliability of the outputs based on the patterns model learned during its training. Consequently, the models serves as an evaluative tool, effectively ranking the outputs of the first and second models according to their predicted performance or suitability. The apparatus for determining system model comparison may be consistent with any metamodel disclosed in U.S. patent application Ser. No. 18/409,687, filed on Jan. 10, 2024, and titled "System and Method for Machine Learning Model Generation," the entirety of which is incorporated herein by reference.

With continued reference to FIG. 1, a model used to compare and evaluate performance of model may be capable of generating multiple outputs. Designing machine-learning model 124 to assess each model independently, processing outputs of first and second models separately produce distinct evaluation of each. Machine-learning model 124 may enable apparatus to offer a comprehensive and individualized analysis of performance of each model. These evaluations may comprise various performance metrics such as accuracy scores, prediction probabilities, or any other relevant measures that qualify model's behavior, effectiveness, reliability, and overall behavior. For example, output of each model may be compared to an ideal or expected result, thereby providing a direct measure of the model's accuracy. Beyond conventional accuracy or error metrics, method extends to more business-oriented metrics, namely the potential value generation. Machine-learning model 124 may calculate a value-based score for each model, which is indicative of the estimated net income, asset price appreciation, or other financially relevant metrics that are derived from the output of the valuation optimization models. By comparing these value-based scores, the machine-learning model offers an insightful measure of each model's performance in terms of potential value generation. The comparison not only provides a relative performance assessment but also serves as a strategic decision-making tool. In a non-limiting example, based on the outputs and scores from the two models, a management optimization element may recommend a change in strategy or adjustment in operational parameters. If one model demonstrates a higher potential for value generation, the system may advocate prioritizing this model, aligning the operational strategy with the path that maximizes economic benefit for the entity. In this way, performance evaluation may become a strategic cornerstone for both immediate and long-term business decision-making Continuing to refer to FIG. 1, machine-learning model 124 alternatively may be designed to assess the two models in conjunction. In such model, it receives inputs describing both the first and second models' outputs, processes together, and produces an output that directly compares them. Models may take the form of a score, metric, or evaluation that indicates the relative performance or suitability of the two models for a particular task or application. The advantage of this approach is that it directly compares the models, potentially considering correlations or interdependencies between their outputs that might be missed when evaluating each model independently. As a non-limiting example, this comparison may suggest strategic changes or improvements in organizational processes, based on the relative efficiencies of the two models.

Still referring to FIG. 1, an important feature of valuation optimization model may include inherent scalability. As described in this disclosure, "scalability" refers to as an entity grows, either in terms of the number of individuals and clients or in the complexity of the tasks it handles, the model may expand and adapt to meet these increased demands. Performance data from an increasing number of individuals and a growing pool of client data are ingested and processed, machine-learning model 124 may scale to maintain efficiency and accuracy. This may ensure model's continued effectiveness in assessing and identifying optimal strategies for value generation, even as the volume of data it handles increase significantly. In terms of model complexity, the valuation optimization model is designed to incorporate an increasing number of parameters and potentially additional models without a detrimental impact on its performance. This scalability allows for more sophisticated computations and analysis to be undertaken as the entity's operations become more complex. Additionally, as the number of client schedules and optimization models multiplies with the growth of the entity, the model's scalability ensures these may be processed effectively. Despite the increase in schedules and models, the model's output remains accurate and timely, aiding the entity in strategic decision making and operational planning. Furthermore, the model's scalability extends to its performance evaluation capabilities. The system is designed to incorporate additional evaluation metrics and handle larger datasets used to evaluate. As the entity evolves and its needs diversify, the salable performance evaluation capabilities of the system ensure that it may continue to provide robust, reliable metrics that accurately reflect the performance and potential value generation of the model. In essence, the scalability of the valuation optimization model as depicted in FIG. 1 underscores its robustness, adaptability, and long-term utility, making it a powerful tool for entities striving for growth and improved performance.

Still referring to FIG. 1, in some embodiments valuation optimization model, may be designed not only to adapt to an entity's growth but also to embody an approach to building valuable relationships with clients, leveraging a tool known as the D.O.S. conversation mindset. As described in this disclosure, "D.O.S." refers to a powerful tool that allows for a deeper understanding of a client's needs and desires, effectively addressing their dangers, opportunities, and strengths (D.O.S). It encompasses the Dan Sullivan Questions, a future-focused method that uncovers a client's goals and the progress they wish to make over a set period, for example, one year to three years. Through the D.O.S. conversation mindset, the model assesses the '2 a.m.' issues, or the key dangers, that keep clients awake at night, the fear of losing something being a common theme. At the same time, it identifies opportunities, outcomes that may be achieved if these dangers were eliminated, often associated with the excitement of gaining something. Lastly, the model evaluates the client's strengths, their unique talents and capabilities that can be enhanced to maintain their confidence. By integrating the D.O.S. conversation mindset and the data-driven approach of valuation optimization model, client may create a synergistic system that is not just about crunching numbers. Instead, it factors in the human elements of fear, ambition, and ability. This enables the model to provide comprehensive, nuanced, and actionable insights that align with the clients' emotional state and aspirations. In doing so, it places the entity in a unique position to differentiate itself from others, by prioritizing the client's needs first and forging relationships built on understanding, trust, and mutual growth. As a result, the model's impact extends beyond delivering optimal operational and strategic recommendations to the entity. It also facilitates the development of robust, value-driven client relationships that can enhance client satisfaction, loyalty, and long-term business success.

With continued reference to FIG. 1, memory 104 configures processor 108 to generate a state change output corresponding to the system using the comparison. This state change output represents proposed adjustment to the system parameters, mirroring or addressing aspects of the perturbation function applied in the second model. For example, a particular perturbation function led to higher performance in second model, state change could recommend changes in system that align with perturbation. This may entail modifications in system parameters to match the perturbed values, thereby integrating insights gained from perturbation analysis into system function. Another machine-learning model 124 or process may be employed specifically designed to propose state changes based on input comparisons. As a non-limiting example, model may refer to as decision-making or policy model, may be trained on a dataset consisting of past comparison results paired with successful state changes. Dataset may be collected from previous instances of model comparison wherein the corresponding state changes led to improved system performance or outcomes. During the training process, policy model learns the relationships between specific comparison results and successful state changes. Loss function may be used to minimize the difference between its proposed state changes and the state changes in the training data 128 that led to positive results. Once trained, this model can take the comparison results between first and second model as input and propose state change output. Output may suggest modifications to parameters, processes, or roles within system to enhance its overall performance. Recommendations are based on the learned correlations between comparison results and successful state changes. Repeated process may iteratively for specified number of times or until a satisfactory level of performance is reached. With each iteration, system selects the most optimal perturbation function or modal, refining system performance based on the evaluation and comparison of the model's output.

Figure 2:
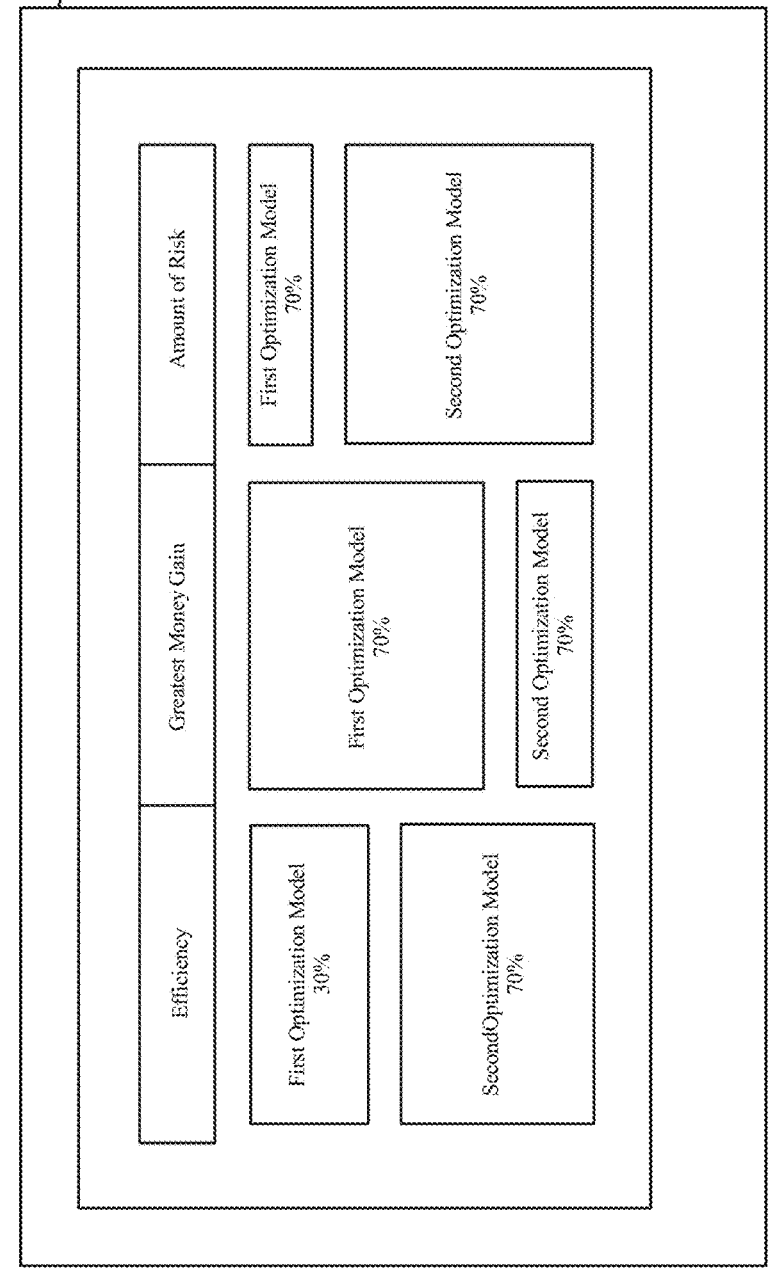
FIG. 2 is an illustrative embodiment of a user interface.
Figure 2:
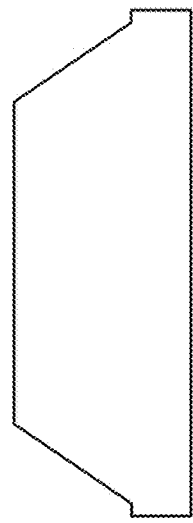

Now referring to FIG. 2, an exemplary representation of a user interface component is presented. User interface 200 display device such as display device 204. In an embodiment, user interface 200 may display first optimization model 208. The interface may include interactive elements with associated event handlers. For example, user may interact with the displayed first optimization model by selecting different parameters or options, with each interaction triggering an event handler to update the display or process the user's input. In another embodiment, user interface 200 may display step-by-step instructions or suggestions on how to improve second optimization model 212. In an example, without limitations, user interface 200 may include interactive tutorials or guides, with event handlers used to track the user's progress, provide feedback, or adapt the instructions based on the user's actions. In a further example, user interface 200 may display a graphical representation of the entity specific recommendation 212. This may include bullet point description with figures depicting how the user's second optimization model compares with the first optimization model. Event handlers could be used to update display 204 as user interacts with the comparison, such as by highlighting specific bullets points or figures, expanding details on demand, or providing additional contextual information based on the user's interaction. Furthermore, user interface 200 may present a user the separate goals to generate user profile 120. User may select or modify with event handlers, triggered by these interactive to update user profile 120, provide feedback, or guide the user through the process. For example, event handler could be activated when a user modifies a goal, updating the user profile and providing immediate feedback on the impact of this change. Through the use of event handler, user interface 200 can create a dynamic and responsive environment that adapt to user interactions and provides real-time feedback, thus enhancing the overall user experience and facilitating the understanding and application of the optimization models.

Figure 3:
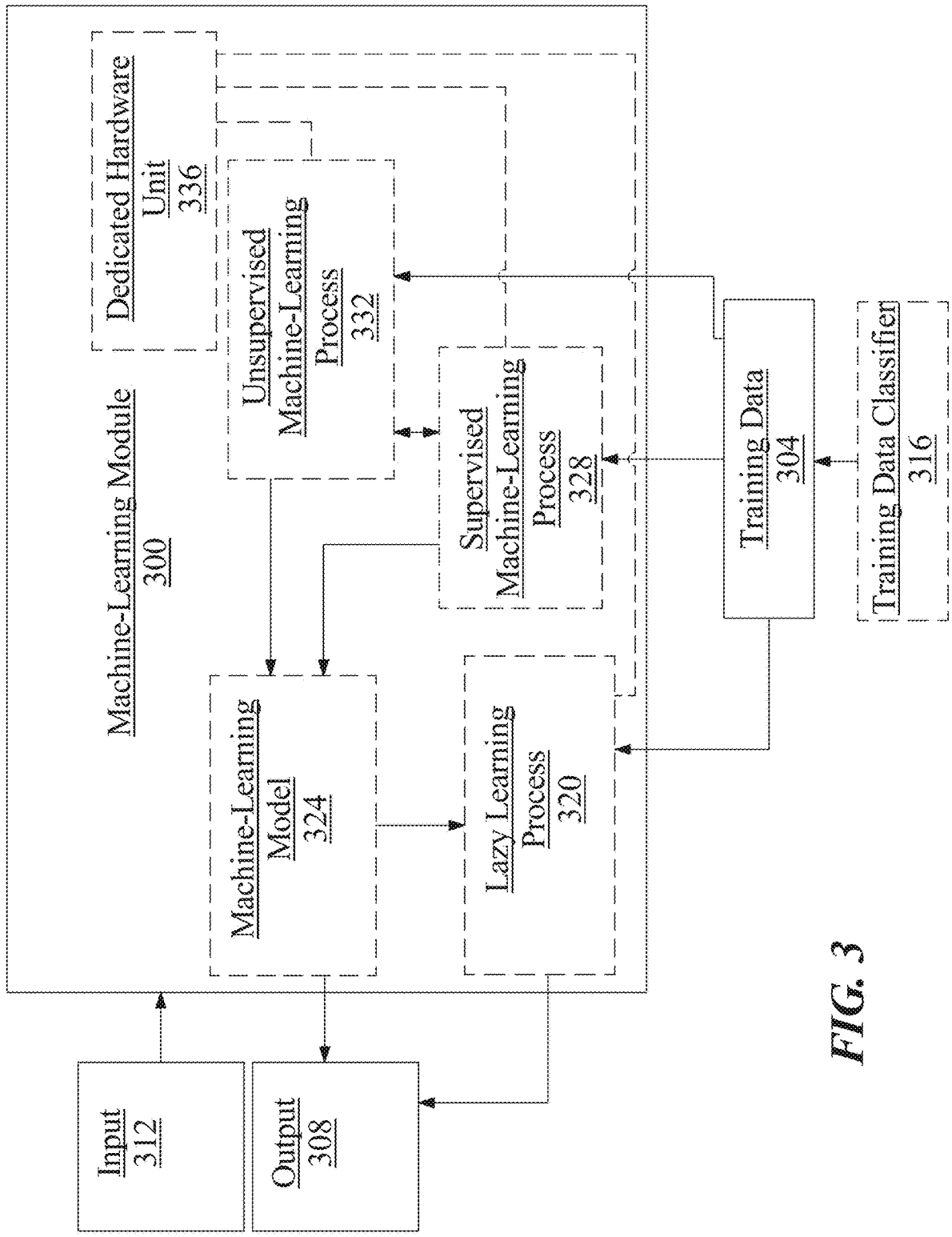
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure As a non-limiting example, model may refer to as decision-making or policy model, may be trained on a dataset consisting of past comparison results paired with successful state changes. Dataset may be collected from previous instances of model comparison wherein the corresponding state changes led to improved system performance or outcomes. During the training process, policy model learns the relationships between specific comparison results and successful state changes. Loss function may be used to minimize the difference between its proposed state changes and the state changes in the training data 128 that led to positive results. Once trained, this model can take the comparison results between first and second model as input and propose state change output. Output may suggest modifications to parameters, processes, or roles within system to enhance its overall performance. Recommendations are based on the learned correlations between comparison results and successful state changes. Repeated process may iteratively for specified number of times or until a satisfactory level of performance is reached. With each iteration, system selects the most optimal perturbation function or modal, refining system performance based on the evaluation and comparison of the model's output.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors' classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to subsets represent particular types of clients. A subset of the data may be categorized according to the industry sector of the clients. This may include sectors such as technology, healthcare, retail, finance, and others. In addition to industry sectors, training data may also be classified based on the geographic location of the clients. This location may include specific countries, regions, cities, or even rural vs urban settings. Another way to classify training data may be based on the size of client companies, segregating the data into subsets representing small businesses, medium-sized enterprises, and large corporations. Filtering the training data in these ways allows the machine-learning algorithms to be more focused and precise in its learning process. By tailoring the data to be more specific to a particular subject of analysis, the algorithm can develop a more nuanced understanding of the patterns and relationships within the subject, thereby improving the accuracy and relevance of the generated model. This leads to more accurate valuation optimization models that are better suited to the entity's specific needs and goals, which ultimately enhances the value the entity can provide to its clients. The improved function of machine-learning training algorithm and model due to this specific filtering of training data becomes especially beneficial when determining the valuation optimization model. As each subset of training data represents a specific group of clients, the generated model becomes more tailored and specific to the nuances of that group. Consequently, entity may offer more targeted and effective strategies to each client based on their particular characteristics, thus enhancing client satisfaction and the overall success of the entity.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described in this disclosure as input, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 332. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 332 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 332 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 332 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
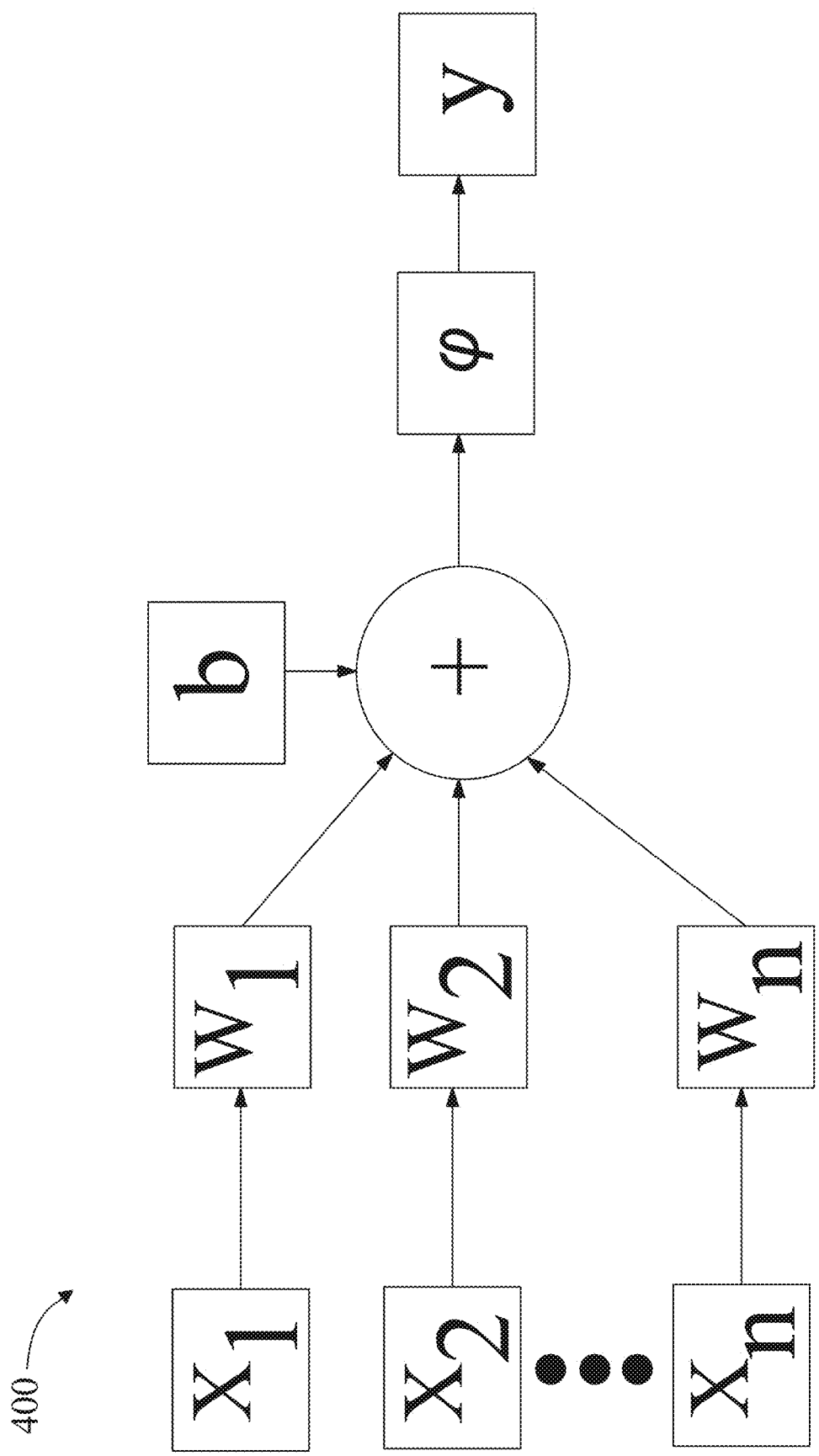
FIG. 4 is a diagram of an exemplary embodiment of a node of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Referring now to FIG. 4, an exemplary embodiment of a node 400 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
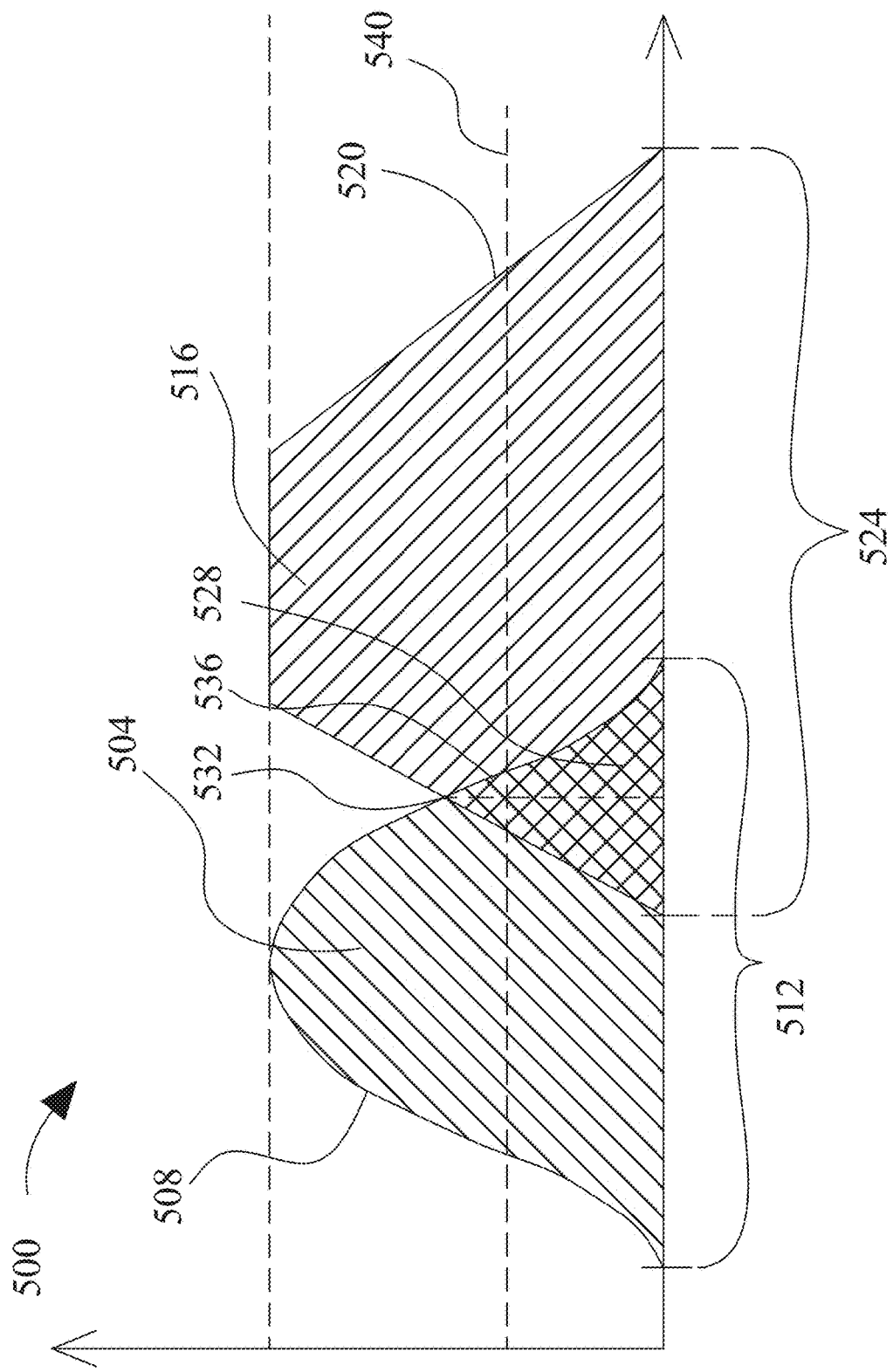
FIG. 5 is a graph illustrating an exemplary relationship between fuzzy sets.

Referring to FIG. 5, an exemplary embodiment of fuzzy set comparison 500 is illustrated. A first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 5, first fuzzy set 504 may represent any value or combination of values as described above, including output from one or more machine-learning models and biofeedback signals from sensor 108, a predetermined class, such as without limitation a user state (e.g., attentive, inattentive, and the like). A second fuzzy set 516, which may represent any value which may be represented by first fuzzy set 504, may be defined by a second membership function 520 on a second range 524; second range 524 may be identical and/or overlap with first range 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 532 representing a probability, as defined on probability interval, of a match between first fuzzy set 504 and second fuzzy set 516. Alternatively, or additionally, a single value of first and/or second fuzzy set may be located at a locus 536 on first range 512 and/or second range 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between outputs from first and second models, or the degree of similarity between these outputs and a given state change recommendation. This may be sufficient for determining the optimality or acceptability of a proposed state change in system, as part of the matching process. For instance, the threshold may indicate a sufficient degree of overlap or similarity between the model outputs and a predefined optimal state, such as without limitation a desired state of efficiency, performance, or other system parameter. This overlap or similarity could be determined based on the comparison of first and second model outputs, and/or the degree to which these outputs align with the desired state change. Alternatively, or additionally, each threshold may be tuned by a machine-learning model, to optimize sensitivity or specificity of matching process. For example, machine-learning models may be trained on past instances of model comparison and state change implementation, with the threshold being adjusted based on observed relationship between model output similarity and successful state changes. This may help ensure the threshold value is set at a level that maximizes the likelihood of identifying beneficial state changes, while minimizing the risk of false positives or negatives.

Further referring to FIG. 5, in an embodiment, a degree of match between fuzzy sets may be used to classify a biofeedback signal with a user state. For example, the comparison results of a pair of model outputs have a fuzzy set matching a pre-defined optimal output fuzzy set by having a degree of overlap exceeding a threshold, apparatus 100 may propose a state change that corresponds to the pre-defined optimal state. When multiple fuzzy matches are performed (i.e., comparisons between multiple pairs of models), degrees of match for each respective fuzzy set may be computed and aggregated through, for instance, addition, averaging, or the like, to determine an overall degree of match. This overall degree of match may then be used to select the most optimal state change recommendation among those proposed.

Still referring to FIG. 5, in an embodiment, output results from different models may be compared to multiple optimal output fuzzy sets. For example, model's output may be represented by fuzzy set that is compared to each of multiple optimal output fuzzy sets; and degree of overlap exceeding a threshold between model's output fuzzy set and any of multiple optimal output fuzzy sets may cause the apparatus 100 to classify the model's output as being closer to a particular optimal state. In another example, in one embodiment, there may be two optimal output fuzzy sets, representing respectively optimal state for high efficiency and optimal state for high accuracy. High efficiency may have a high efficiency fuzzy set; high accuracy may have a high accuracy fuzzy set; and model's output may have output fuzzy set. Apparatus 100, for example, may compare output fuzzy set with each of high efficiency fuzzy set and high accuracy fuzzy set, as described above, and classify model's output to either, both, or neither of the high efficiency state nor high accuracy state. Machine-learning methods as described throughout may, in a non-limiting example, generate coefficients used in fuzzy set equations as described above, such as without limitation x, c, and σ of a Gaussian set as described above, as outputs of machine-learning methods. Likewise, model outputs may be used indirectly to determine a fuzzy set, as output fuzzy set may be derived from outputs of one or more machine-learning models that take the comparison results directly or indirectly as inputs.

Figure 6:
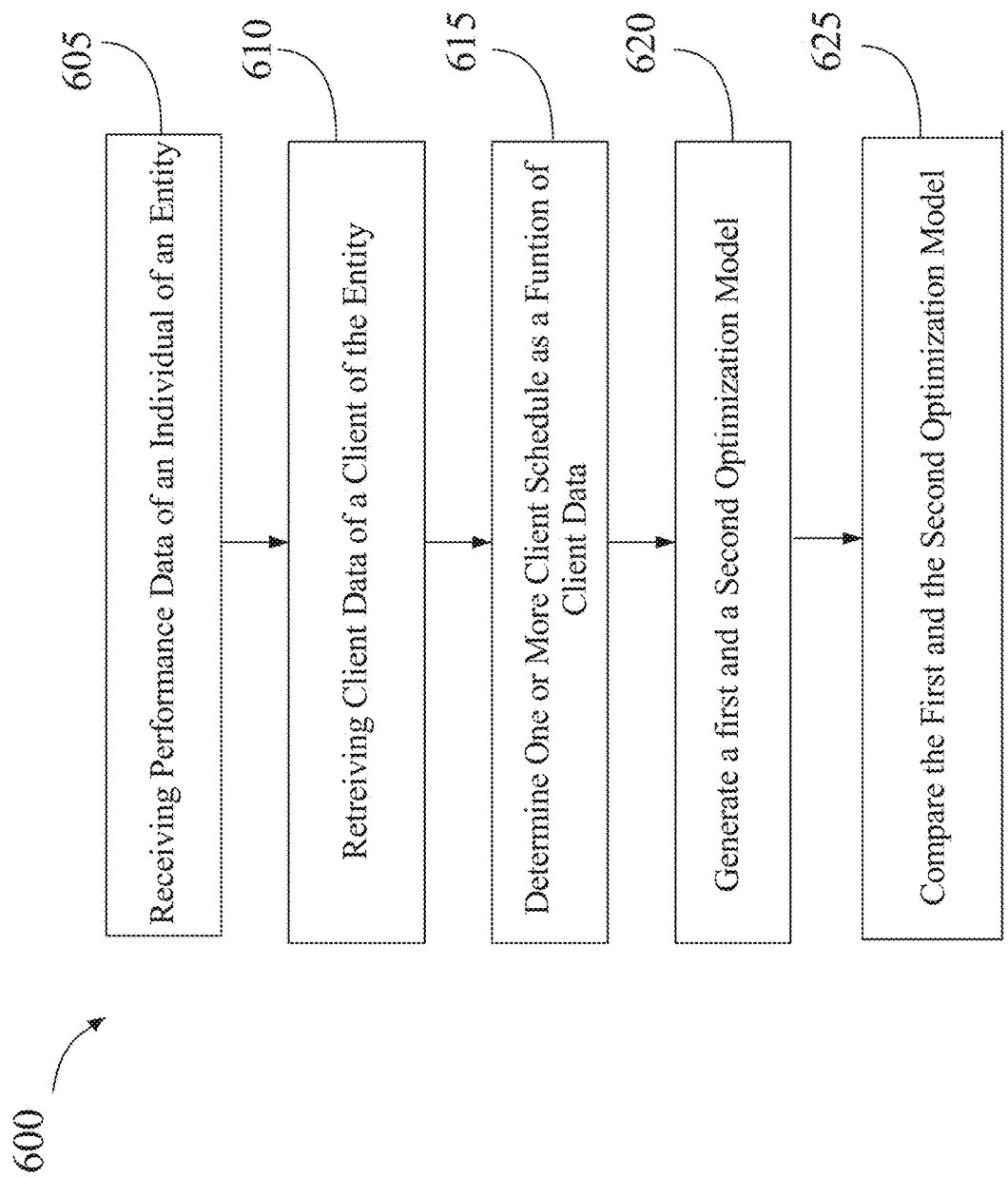
FIG. 6 is a flow diagram illustrating an exemplary workflow in one embodiment of the present invention.

Referring now to FIG. 6, a flow diagram of an exemplary method 600 for the system model comparison is illustrated. At step 605, method 600 includes receiving, by the at least a processor, a plurality of system data. This may be implemented as described and with reference to FIGS. 1-6. In some embodiments, extracting the performance data may comprise receiving the performance data using a web crawler or a chatbot.

Still referring to FIG. 6, at step 610, method 600 includes determining, by the at least a processor, the first model of the system 140 according to the system data and the second model of the system 144 according to the system data. This may be implemented as described and with reference to FIG. 1-6.

Still referring to FIG. 6, at step 615, method 600 includes determining, using at least a processor 108, a first model of the system 140 and the second plurality of system data 116. This may be implemented as described and with reference to FIG. 1-6.

Still referring to FIG. 6, at step 620, method 600 includes generating the first model of the system, using the system data, and generating the second model of the system, using the system data. This may be implemented as described and with reference to FIGS. 1-6.

Still referring to FIG. 6, at step 625, method 600 includes comparing the first model output to the second model output using an optimization function 136 and generating a state change output corresponding to the system using the comparison. This may be implemented as described and with reference to FIGS. 1-6.

Figure 7:
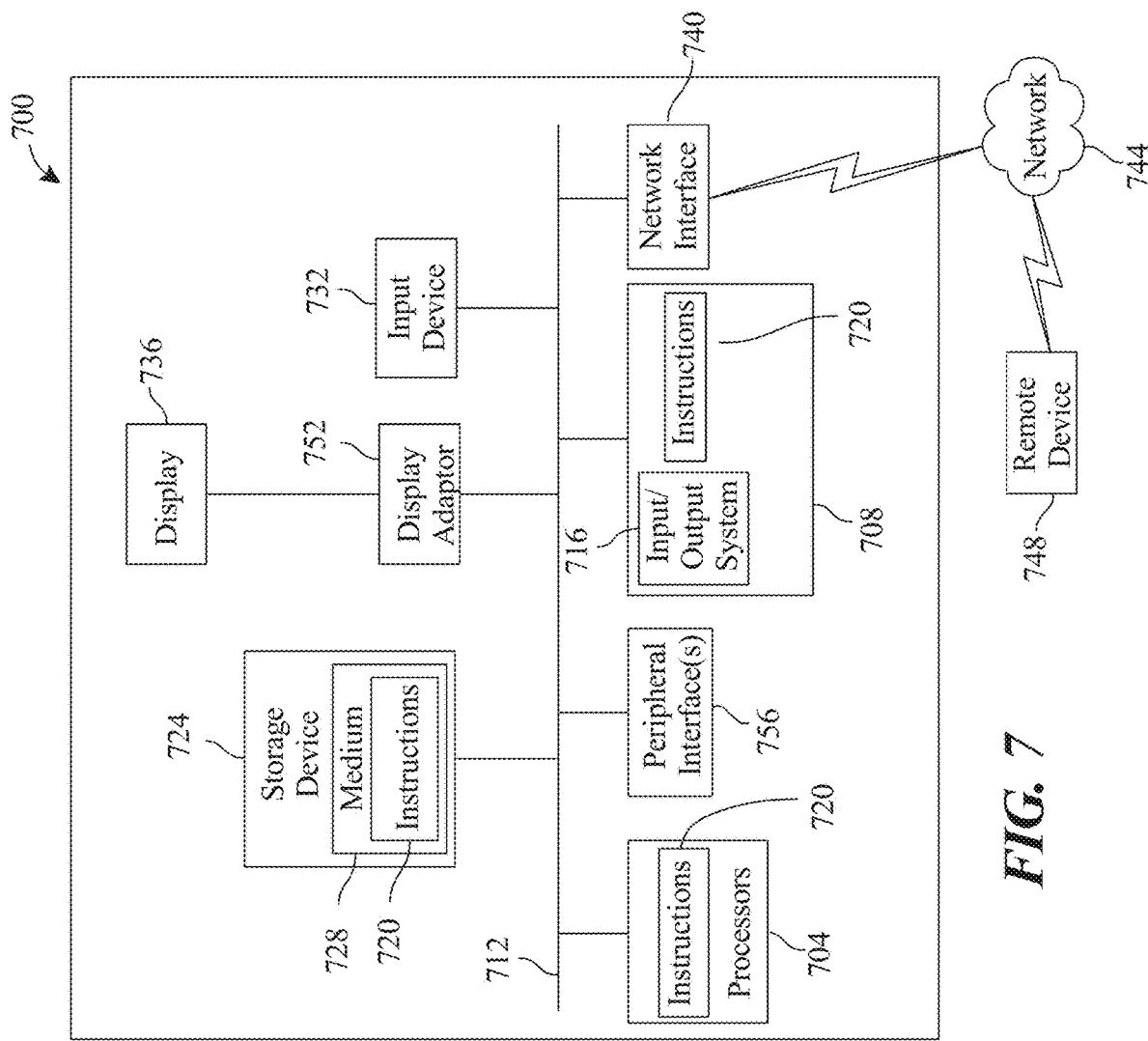
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for determining system model comparison, wherein the apparatus comprises:
   at least a processor; and
   a memory communicatively linked to the at least a processor, wherein the memory contains instructions configuring the at least a processor to:
   receive a first plurality of system data, wherein the first plurality of system data representing a first state of a system, wherein the first plurality of system data comprises first operational and performance metrics;
   receive a second plurality of system data representing a second state of the system, wherein the second plurality of system data comprises second operational and performance metrics;
   generate a first model of the system, using the first plurality of system data;
   generate a second model of the system, using the second plurality of system data;
   output a first model output using the first model of the system and the second plurality of system data;
   modify the second plurality of system data using at least a perturbation function;
   output a second model output using the second model of the system and the modified second plurality of system data applied in the second model; and
   train a machine learning model, wherein training the machine learning model comprises:
   receiving a training dataset comprising outputs from at least the first model correlated to corresponding evaluations of the at least the first model;
   adjusting the machine learning model using the training dataset and a loss function;
   comparing new outputs of the adjusted machine learning model to the training dataset;
   processing the new outputs of the adjusted machine learning model with the outputs of at least the first model as a function of at least a learned pattern of the adjusted machine learning model; and
   generating a score for the outputs of the at least the first model using the adjusted machine learning model, wherein the score for the outputs of the at least the first model indicates a quality value of the outputs of the at least the first model, wherein the quality value is compared against a quality benchmark; and
   compare the first model output to the second model output using the trained machine learning model and the generated score;
   generate a state change output corresponding to the system utilizing the trained machine learning model and the generated score, wherein the state change output comprises at least a proposed adjustment to a plurality of parameters of the system mirroring the perturbation function applied in the second model; and present the proposed adjustment as a graphical representation on a user interface including interactive elements by activating event handlers of the user interface to refine system performance of the system based on the proposed adjustment.

2. The apparatus of claim 1, wherein:
the first plurality of system data further comprises a plurality of data describing system inputs and a plurality of data describing correlated system outputs; and
the first model of the system further comprises a machine-learning model, wherein determining the first model of the system comprises training the first model of the system using the plurality of data describing system inputs and the plurality of data describing correlated system outputs.

3. The apparatus of claim 1, wherein:
the second plurality of system data further comprises a plurality of data describing system inputs and a second plurality of data describing correlated system outputs; and
the second model of the system further comprises a machine-learning model determining the second model of the system comprises training the second model of the system using the plurality of data describing system inputs and the plurality of data describing correlated system outputs.

4. The apparatus of claim 1, wherein outputting the first model output further comprises identifying at least a datum of the second plurality of system data representing a system input, and inputting the at least a datum into the first model.

5. The apparatus of claim 1, wherein the at least a perturbation function modifies data representing inputs to the system.

6. The apparatus of claim 1, wherein the at least a perturbation function modifies data representing internal parameters of the system.

7. The apparatus of claim 6, wherein the apparatus is further configured to modify the second model using the data representing internal parameters of the system.

8. The apparatus of claim 1, wherein comparing the first model output to the second model output comprises: comparing the first model output and the second model output using a fuzzy inferencing system; and generating the state change output corresponding to the system using the comparison.

9. A method for determining system model comparison, wherein the method comprises:
receiving, by at least a processor, a first plurality of system data representing a first state of a system, wherein the first plurality of system data comprises first operational and performance metrics;
receiving, by at least the processor, a second plurality of system data representing a second state of the system, wherein the second plurality of system data comprises second operational and performance metrics;
generating, by the at least a processor, a first model of the system according to the first plurality of system data;
generating, by the at least a processor, a second model of the system, using the second plurality of system data;
outputting, by the at least a processor, a first model output using the first model of the system and the second plurality of system data;

modifying, by the at least a processor, the second plurality of system data using at least a perturbation function;
outputting, by the at least a processor, a second model output using the second model of the system and the modified second plurality of system data applied in the second model;
training, by the at least a processor, a machine learning model, wherein training the machine learning model comprises:
receiving a training dataset comprising outputs from at least the first model correlated to corresponding evaluations of the at least the first model;
adjusting a machine learning model using the training dataset and a loss function;
comparing new outputs of the adjusted machine learning model to the training dataset;
processing the new outputs of the adjusted machine learning model with the outputs of the at least the first model as a function of at least a learned pattern of the adjusted machine learning model; and
generating a score for the outputs of the at least the first model using the adjusted machine learning model, wherein the score for the outputs of the at least the first model indicates a quality value of the outputs of the at least the first model, wherein the quality value is compared against a quality benchmark;
comparing, by the at least a processor, the first model output to the second model output using the trained machine learning model and the generated score;
generating, by the at least a processor, a state change output corresponding to the system utilizing the trained machine learning model and the generated score, wherein the state change output comprises at least a proposed adjustment to a plurality of parameters of the system mirroring the perturbation function applied in the second model; and
presenting, by the at least a processor, the proposed adjustment as a graphical representation on a user interface including interactive elements by activating event handlers of the user interface to refine system performance of the system based on the proposed adjustment.

10. The method of claim 9, wherein generating, by the at least a processor, the first model of the system according to the system data comprises identifying a need and a schedule of the first model of the system.

11. The method of claim 9, wherein generating, by the at least a processor, the first model of the system and the second plurality of system data includes determining an optimization function of each model of the system.

12. The method of claim 11, wherein the first model of the system and the second plurality of system data comprise information relating to a degree of the optimization function in each model of the system.

13. The method of claim 9, wherein outputting, by the at least a processor, the second model output using the second model of the system and the modified second plurality of system data comprises determining allocating priority to each optimization function of each model of the system.

14. The method of claim 9, wherein modifying, by the at least a processor, the second plurality of system data using the at least a perturbation function comprises: receiving first model system data and the second plurality of system data; comparing using an optimization function; and generating second model system data and the second plurality of system data.

15. The method of claim 9, wherein generating, by the at least a processor, the state change output corresponding to the system comprises: receiving a plurality of complementary system data from a database; and determining an ideal approach to achieving in a model system using comparison in optimization function.

16. The method of claim 15, wherein the comparison in optimization function comprises a plurality of second system data.

17. The method of claim 9, generating, by the at least a processor, the state change output corresponding to the system using the comparison, wherein the generation comprises determining a system model comparison as a function of a comparison machine learning model.

* * * * *